(12) United States Patent
Eiraku

(10) Patent No.: US 6,814,035 B2
(45) Date of Patent: Nov. 9, 2004

(54) INTAKE QUANTITY CONTROL APPARATUS OF INTERNAL COMBUSTION ENGINE

(75) Inventor: Akira Eiraku, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/766,887

(22) Filed: Jan. 30, 2004

(65) Prior Publication Data

US 2004/0182346 A1 Sep. 23, 2004

(30) Foreign Application Priority Data

Feb. 12, 2003 (JP) ........................................ 2003-033734

(51) Int. Cl.[7] ................................................. F01L 9/04
(52) U.S. Cl. .................... 123/90.11; 123/395
(58) Field of Search ............................ 123/90.1, 90.11, 123/90.15, 90.24, 704, 319, 395, 402

(56) References Cited

U.S. PATENT DOCUMENTS 5,495,830 A * 3/1996 Wu ......................... 123/90.15
6,234,144 B1 5/2001 Yamaguchi et al.

FOREIGN PATENT DOCUMENTS

JP   A 2000-204983   7/2000
JP   A 2001-159341   6/2001

* cited by examiner

Primary Examiner—Bibhu Mohanty
(74) Attorney, Agent, or Firm—Oliff & Berridge, PLC

(57) ABSTRACT

An intake quantity control apparatus for an internal combustion engine which controls a valve opening characteristic and intake pressure to control the intake quantity more suitably is provided. The apparatus includes a valve opening characteristic control unit for controlling a valve opening characteristic, an intake pressure control unit for controlling an intake pressure and controlling the valve opening characteristic and the intake pressure so as to control the intake quantity, comprises a target intake quantity determining unit for determining a target intake quantity for after elapse of a predetermined time, a unit for determining a range of valve opening characteristic realizable in a predetermined time, and a unit for determining a range of intake pressure realizable in a predetermined time, the valve opening characteristic and the intake pressure being controlled by the valve opening characteristic control unit and the intake pressure control unit so as to become a target valve opening characteristic and target intake pressure set in the realizable ranges based on the target intake quantity.

8 Claims, 11 Drawing Sheets

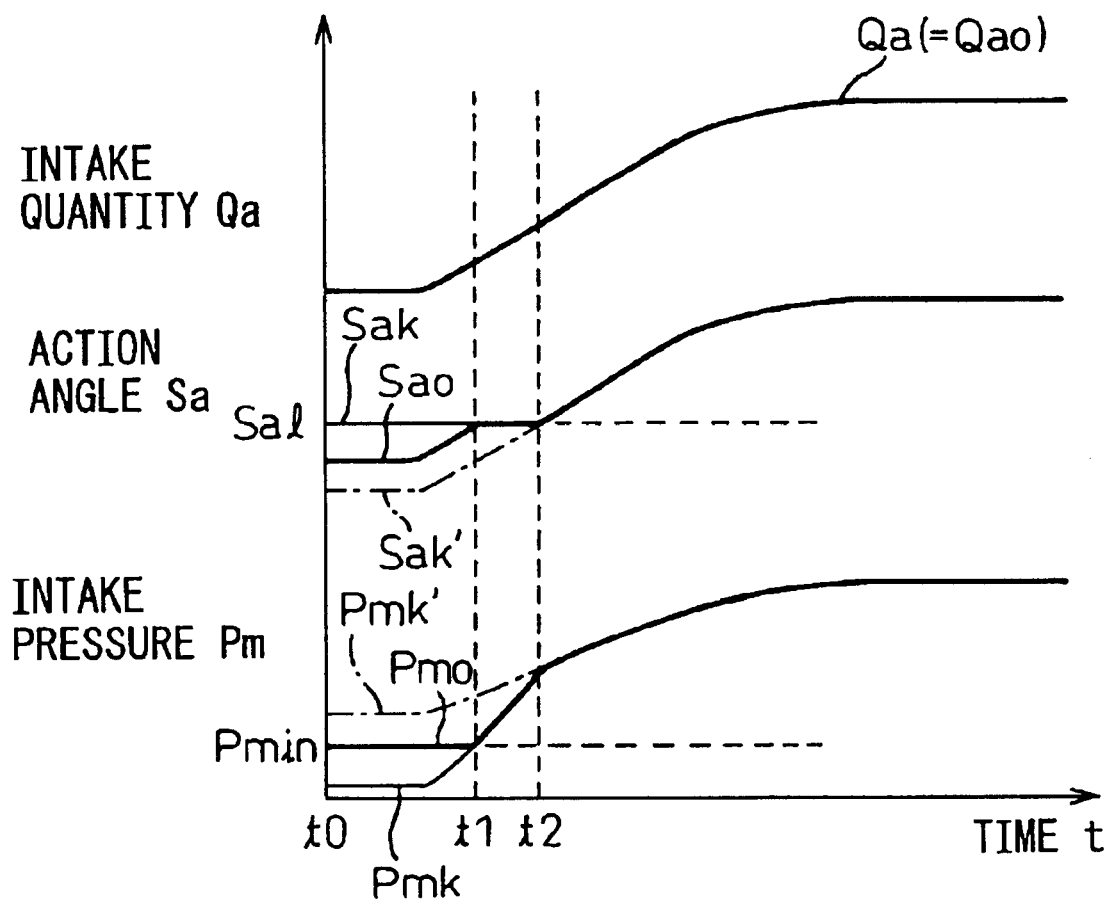

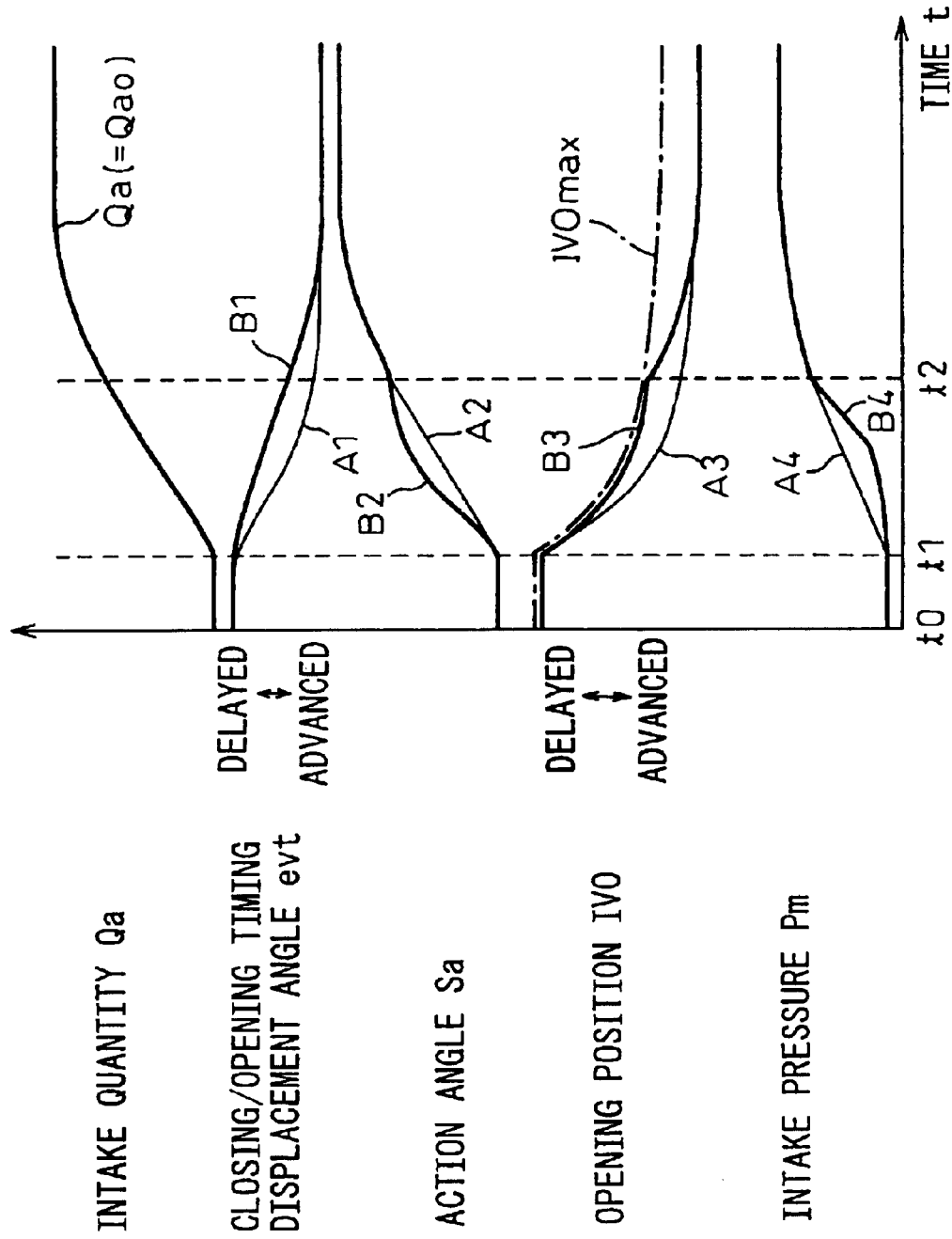

INTAKE QUANTITY CONTROL APPARATUS OF INTERNAL COMBUSTION ENGINE

BACKGROUND OF THE INVENTION

1. Field of the Invention

The present invention relates to an intake quantity control apparatus of an internal combustion engine.

2. Description of the Related Art

Known in the art is an intake quantity control apparatus of an internal combustion engine having a variable valve mechanism for controlling a valve opening characteristic of at least one of an intake valve and exhaust valve and having a throttle valve for controlling an intake pressure which is designed to control a quantity of air taken into a combustion chamber (hereinafter referred to as an "intake quantity") by coordinated control of the valve opening characteristic and the opening degree of the throttle valve (more particularly the intake pressure).

In this type of intake quantity control apparatus, changes in characteristics of the valve spring, changes in friction due to fouling, etc. sometimes cause the time lag of the valve opening or valve closing operation with respect to a valve opening or valve closing instruction (operation time lag) to vary among the cylinders or the operation time lag to vary with each intake even in one cylinder. Due to this, sometimes the intake quantity will fluctuate along with time or the intake quantity will fluctuate among cylinders.

Japanese Unexamined Patent Publication (Kokai) No. 2000-204983 discloses as a method for suppressing variation or fluctuation in the intake quantity the method of reducing the opening degree of the throttle valve to cause the intake pressure to drop and thereby lengthen the valve opening time of the intake valve when taking in the same amount of air so as to lower the ratio of the operation time lag with respect to the total valve opening time and thereby reduce its effect.

SUMMARY OF THE INVENTION

Incidentally, in the above intake quantity control apparatus, in general a target intake quantity is determined from the operating state of the internal combustion engine, then the valve opening characteristic or intake pressure for realizing this target intake quantity is estimated. In estimation of the valve opening characteristic or intake pressure, a predetermined method is utilized to estimate the valve opening characteristic and intake pressure realizing the target intake quantity and giving the optimum combination of the fuel consumption, emission, torque fluctuation, and other conditions in accordance with the operating state of the internal combustion engine. Further, the thus estimated valve opening characteristic or intake pressure is used as a target control value to control the valve opening characteristic of the intake valve or the exhaust valve or the opening degree of the throttle valve.

However, in practice, due to the above-mentioned time lag or factors in the performance of the variable valve mechanism etc., sometimes the above valve opening characteristic or intake pressure cannot reach the target control value in a predetermined time (for example, control period) or sometimes factors in the mechanism etc. mean the valve opening characteristic or intake pressure cannot reach the target control value.

Further, the valve opening characteristic or intake pressure which ends up being adopted in such cases is sometimes not necessarily optimal in terms of the intake quantity. That is, for example, there is sometimes a valve opening characteristic or intake pressure which can realize the target intake quantity or an intake quantity closer to the target intake quantity in a range of valve opening characteristic or intake pressure realizable in the above predetermined time. That is, in such a case, there is room for controlling the intake quantity more suitably. Japanese Unexamined Patent Publication (Kokai) No. 2000-204983 does not touch upon this problem at all and therefore does not consider it at all.

An object of the present invention is to provide an intake quantity control apparatus of an internal combustion engine able to control the intake quantity more suitably by controlling the valve opening characteristic of at least one of the intake valve and exhaust valve and the intake pressure.

The present invention provides various aspects of intake quantity control apparatuses of internal combustion engines described in the claims as means for achieving this object.

According to a first aspect of the invention, there is provided an intake quantity control apparatus for an internal combustion engine having a valve opening characteristic control means for controlling a valve opening characteristic of at least one of an intake valve and an exhaust valve and an intake pressure control means for controlling an intake pressure and controlling the valve opening characteristic and the intake pressure so as to control the intake quantity, comprising a target intake quantity determining means for determining a target intake quantity for after elapse of a predetermined time, a means for determining a range of the valve opening characteristic realizable in a predetermined time by the valve opening characteristic control means, and a means for determining a range of intake pressure realizable in a predetermined time by the intake pressure control means, the valve opening characteristic and the intake pressure being controlled by the valve opening characteristic control means and the intake pressure control means so as to become a target valve opening characteristic and target intake pressure set in the realizable ranges based on the target intake quantity.

If setting the valve opening characteristic and intake pressure targeted for control, that is, the target valve opening characteristic and target intake pressure, without considering the ranges realizable in the predetermined time, if the set target valve opening characteristic and target intake pressure are not in the above realizable ranges, the intake quantity realized by the valve opening characteristic and intake pressure adopted as a result of the control will sometimes differ considerably from the target intake quantity. Further, in such a case, sometimes the above target intake quantity can be realized or an intake quantity closer to the target intake quantity can be realized if using another valve opening characteristic and intake pressure in the above realizable ranges.

According to the present invention, since the target valve opening characteristic and the target intake pressure are set in ranges realizable in a predetermined time while considering the target intake quantity and valve opening characteristic and intake pressure are controlled to the target valve opening characteristic and target intake pressure, the target valve opening characteristic and target intake pressure not being realized and the intake quantity ending up becoming an unintentional intake quantity is prevented. That is, by suitably setting the target valve opening characteristic and target intake pressure, it is possible to reliably realize control giving the optimal intake quantity in the range realizable in a predetermined time and as a result the intake quantity is more optimally controlled. Note that the "valve opening characteristic" in the present specification means one or more of the valve lift, action angle, and valve opening/closing timing.

According to a second aspect of the invention, there is provided an intake quantity control apparatus of the first aspect of the invention further comprising a means for estimating a valve opening characteristic and intake pressure for realizing the target intake quantity by a predetermined method, wherein when both the valve opening characteristic and intake pressure estimated by the means are in the realizable ranges, the estimated valve opening characteristic and intake pressure are set as the target valve opening characteristic and the target intake pressure, while when at least one of the estimated valve opening characteristic and intake pressure is not in the realizable range, a valve opening characteristic and intake pressure in the realizable ranges whereby the intake quantity becomes closest to the target intake quantity or the intake quantity becomes the target intake quantity are set as the target valve opening characteristic and the target intake pressure.

The valve opening characteristic and intake pressure for the above target intake quantity are for example estimated by a predetermined method so as to find a valve opening characteristic and intake pressure realizing the above target intake quantity and giving the optimal combination of fuel consumption, emission, torque fluctuation, and other conditions in accordance with the operating state of the internal combustion engine. However, the thus estimated valve opening characteristic and intake pressure are not necessarily realizable in the above predetermined time. Further, if making the valve opening characteristic and intake pressure estimated by the above predetermined method the target valve opening characteristic and target intake pressure in such a case, the inconvenience explained with reference to the first aspect of the invention may occur.

According to the present invention, since when at least one of the valve opening characteristic and intake pressure estimated by the predetermined method is not in the above realizable range, the target valve opening characteristic and target intake pressure are set so that the intake quantity becomes closest to the above target intake quantity or the intake quantity becomes the target intake quantity in the realizable ranges, so in the same way as in the first aspect of the invention, it is possible to reliably control the intake quantity to become optimal in the range realizable in the above predetermined time and as a result the intake quantity is more optimally controlled.

According to a third aspect of the invention, there is provided an intake quantity control apparatus of the first aspect of the invention wherein when determining the range of valve opening characteristic realizable in a predetermined time, additional restrictions relating to operation of the internal combustion engine are considered. Even if the valve opening characteristic is realizable in terms of the mechanism and performance of the valve opening characteristic control means, sometimes realization of that valve opening characteristic would not be preferable in terms of operation of the internal combustion engine. According to the present invention, such restrictions can be considered, so it is possible to suppress the occurrence of the various inconveniences which may arise due to intake quantity control.

According to a fourth aspect of the invention, there is provided an intake quantity control apparatus of the third aspect of the invention wherein the additional restrictions relating to operation of the internal combustion engine include a positional relationship and/or valve opening characteristics of the intake and exhaust valves. According to the present invention, it is possible to suppress the occurrence of inconveniences in operation of the internal combustion engine which may arise due to intake quantity control. For example, by including as an additional restriction relating to the operation of the internal combustion engine suppressing the valve overlap to not more than a predetermined amount, it is possible to achieve a reduction in the deposits on the intake valve. Further, by including as an additional restriction relating to the operation of the internal combustion engine keeping the opening position of the intake valve from being delayed from a predetermined position or keeping the closing position of the intake valve from being delayed from a predetermined position, knocking can be suppressed.

According to a fifth aspect of the invention, there is provided an intake quantity control apparatus of the first aspect of the invention wherein when determining the range of intake pressure realizable in a predetermined time, additional restrictions relating to operation of the internal combustion engine are considered. According to a sixth aspect of the invention, there is provided an intake quantity control apparatus of the fifth aspect of the invention wherein the additional restrictions relating to operation of the internal combustion engine include maintaining the intake pressure at not more than a predetermined pressure.

In the fifth and sixth aspects of the invention as well, it is possible to suppress the occurrence of the various inconveniences which may arise due to intake quantity control. In particular, according to the sixth aspect of the invention, as the intake pressure is prevented from becoming higher than the predetermined pressure for the sake of the intake quantity control, when the engine has a configuration to utilize the fact that the intake pressure is a negative pressure, for example, a brake assist mechanism etc., good operation of this configuration can be maintained by suitably setting the above predetermined pressure.

According to a seventh aspect of the invention, there is provided an intake quantity control apparatus for an internal combustion engine controlling an intake quantity by a valve opening characteristic control means for controlling a valve opening characteristic of at least one of an intake valve and an exhaust valve and an intake pressure control means for controlling an intake pressure, comprising a target intake quantity determining means for determining a target intake quantity for after elapse of a predetermined time, a target valve opening characteristic determining means for determining a target valve opening characteristic of the valve opening characteristic control means based on the target intake quantity, a target intake pressure determining means for determining a target intake pressure of the intake pressure control means based on the target intake quantity and the target valve opening characteristic, a means for determining a range of valve opening characteristic realizable in a predetermined time by the valve opening characteristic control means, a means for determining a range of intake pressure realizable in a predetermined time by the intake pressure control means, an operation region determining means determining a realizable operation region from ranges of realizable valve opening characteristic and intake pressure, and a target value resetting means for determining a suitable operation point from the range of operation region when the operation point determined from the target valve opening characteristic and the target intake pressure is not in the realizable operation region and resetting the target values of the valve opening characteristic control means and the intake pressure control means from the operation point.

According to an eighth aspect of the invention, there is provided an intake quantity control apparatus of the seventh aspect of the invention wherein the target value resetting means determines an operation point able to realize the target intake quantity or an intake quantity resembling the target intake quantity in the range of realizable operation region and resets the target values of the valve opening characteristic control means and the intake pressure control means from that operation point.

BRIEF DESCRIPTION OF THE DRAWINGS

These and other objects and features of the present invention will become clearer from the following description of the preferred embodiments given with reference to the attached drawings, wherein:

FIG. 13 is a view similar to FIG. 12 of another example of the case of intake quantity control by an intake quantity control apparatus according to an embodiment of the present invention; and FIG. 14 is a view of changes along with time of the intake quantity Qa, displacement angle evt of the opening/closing timing of an intake valve, action angle Sa, opening position IVO of the intake valve, and intake pressure Pm at the time of control as a further example of intake quantity control by an intake quantity control apparatus according to an embodiment of the present invention.

DESCRIPTION OF THE PREFERRED EMBODIMENTS

Figure 1:
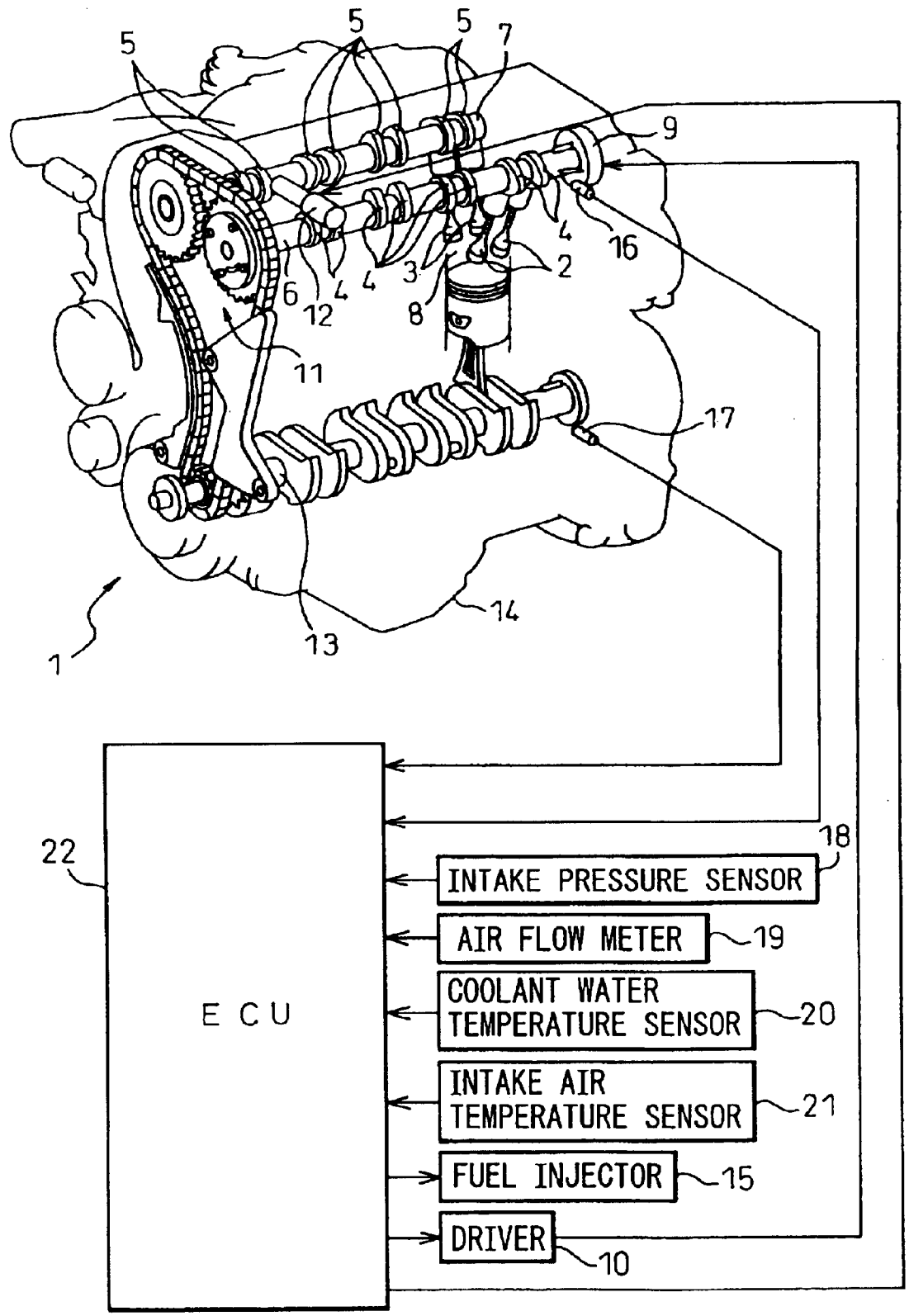
FIG. 1 is a schematic view of the configuration of an internal combustion engine using an intake quantity control apparatus according to an embodiment of the present invention.

Preferred embodiments of the present invention will be described in detail below while referring to the attached figures. In the figures, identical or similar parts are assigned common reference numerals.

Figure 2:
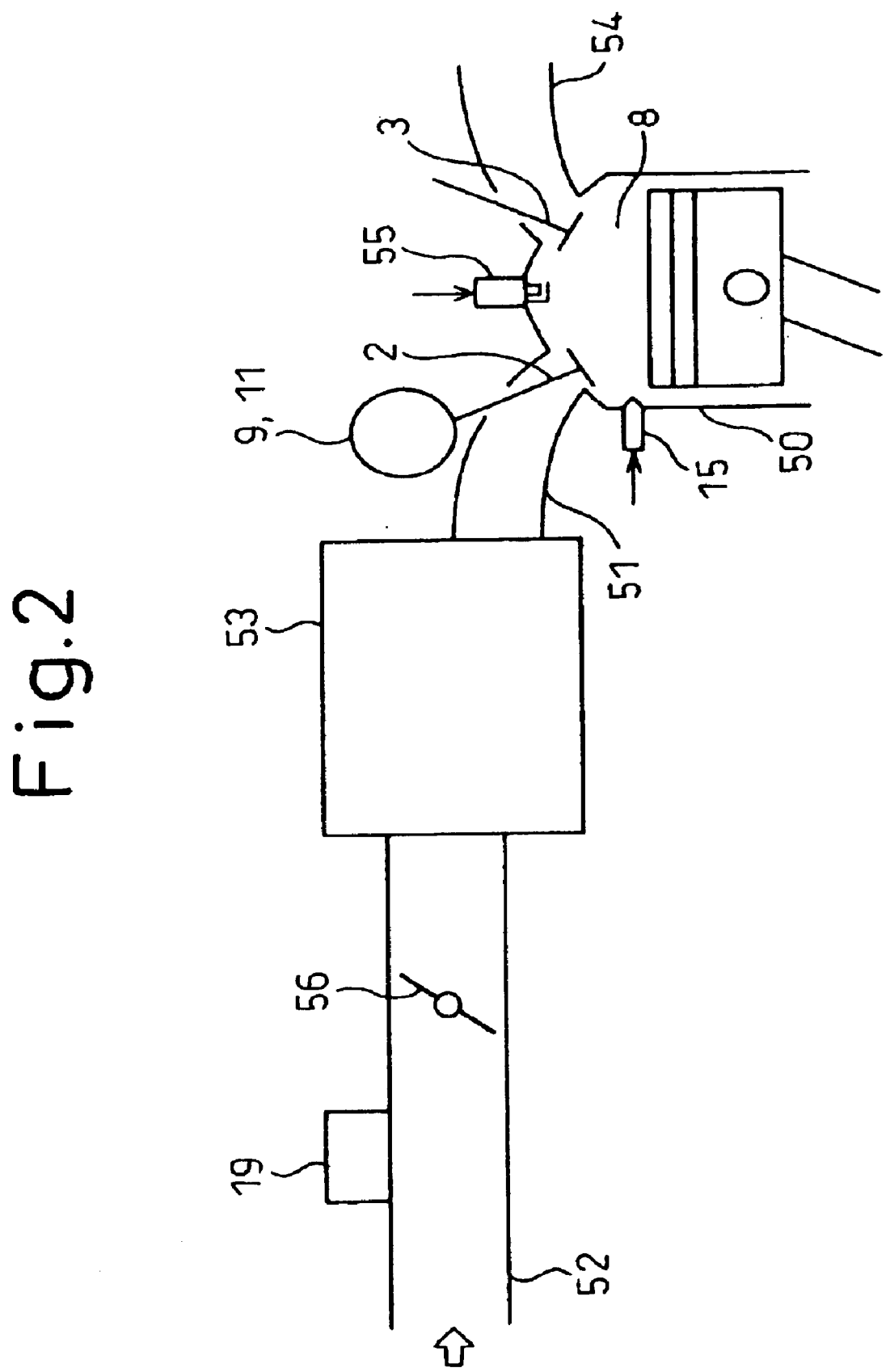
FIG. 2 is a detailed view of an intake system etc. of an internal combustion engine shown in FIG. 1.

FIG. 1 is a schematic view of the configuration of an internal combustion engine using an intake quantity control apparatus according to an embodiment of the present invention, while FIG. 2 is a detailed view of the intake system etc. of the internal combustion engine shown in FIG. 1. In FIG. 1 and FIG. 2, 1 is an internal combustion engine body, 2 is an intake valve, 3 is an exhaust valve, 4 is a cam for opening and closing the intake valve, 5 is a cam for opening and closing the exhaust valve, 6 is a camshaft supporting the intake valve cam 4, and 7 is a camshaft supporting the exhaust valve cam 5.

Figure 3:
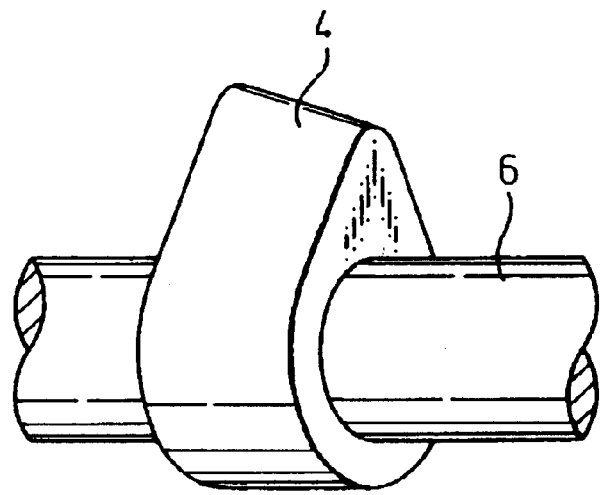
FIG. 3 is a detailed view of an intake valve cam and camshaft shown in FIG. 1.

FIG. 3 is a detailed view of the intake valve cam 4 and camshaft 6 shown in FIG. 1. As shown in FIG. 3, the cam profile of the cam 4 of the present embodiment changes in the direction of the centerline of the camshaft. That is, the cam 4 of the present embodiment has a greater nose height at the left end of FIG. 3 than the nose height at the right end. That is, the valve lift of the intake valve 2 of the present embodiment becomes smaller when the valve lifter contacts the right end of the cam 4 than when the valve lifter contacts the left end of the cam 4.

Further, in the present embodiment, the action angle corresponding to the opening time (i.e opening period) of the intake valve 2 also changes along with the change of the valve lift. That is, the action angle of the intake valve 2 of the present embodiment becomes smaller when the valve lift is small (that is, when the valve lifter contacts the right end of the cam 4) than when the valve lift is large (that is, when the valve lifter contacts the left end of the cam 4).

Figure 8:
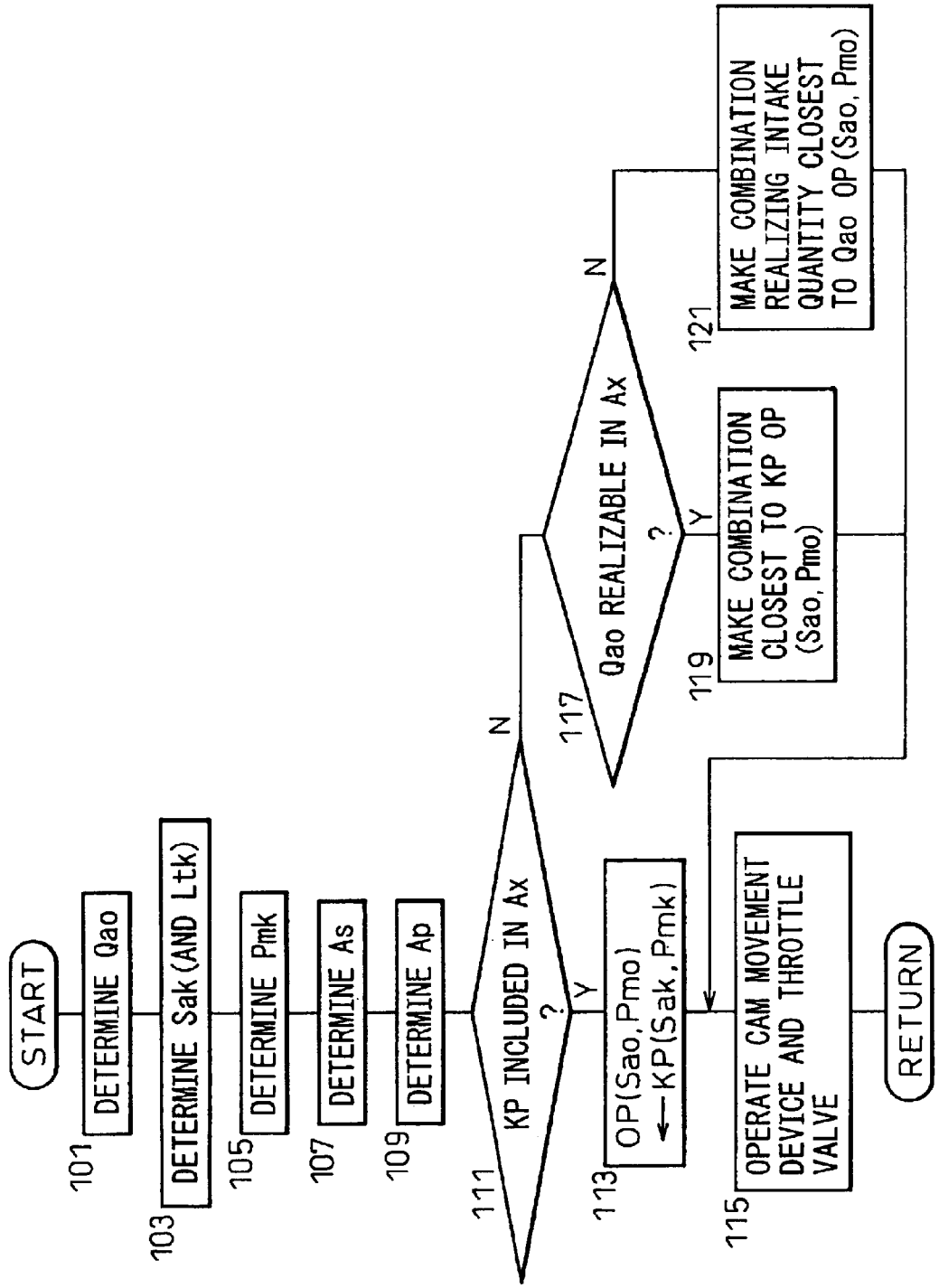
FIG. 8 is a flow chart of a control routine for intake quantity control in an intake quantity control apparatus according to an embodiment of the present invention.

Returning again to the explanation of FIG. 1 and FIG. 2, 8 is a combustion chamber formed in a cylinder, while 9 is a cam movement device for making the cam 4 move in the direction of the centerline of the camshaft with respect to the intake valve 2 so as to change the valve lift and the action angle. That is, by operating the cam movement device 9, it is possible to bring the cam 4 and the valve lifter into contact at the left end of the cam 4 (FIG. 3) or bring the cam 4 and valve lifter into contact at the right end of the cam 4 (FIG. 3). If operating the cam movement device 9 to change the valve lift of the intake valve 2, the open area of the intake valve 2 is changed accordingly. In the intake valve 2 of the present embodiment, the open area of the intake valve 2 increases as the valve lift increases. Reference numeral 10 is a driver for driving the cam movement device 9.

On the other hand, 11 is an opening/closing timing shift device for shifting the opening/closing timing without changing the valve lift and action angle of the intake valve 2. That is, by operating the opening/closing timing shift device 11, it is possible to shift the opening/closing timing of the intake valve 2 to the advanced side or shift it to the delayed side. Due to this, it is also possible to adjust the valve overlap. Reference numeral 12 is an oil control valve for controlling the oil pressure for operating the opening/closing timing shift device 11.

Reference numeral 13 is a crankshaft, 14 is an oil pan, 15 is a fuel injector, 16 is a valve opening characteristic sensor for detecting the valve lift, the action angle and the opening/closing timing shift of the intake valve 2, and 17 is a sensor for detecting the engine speed. Reference numeral 18 is an intake pressure sensor for detecting the pressure in an intake pipe supplying intake air into a cylinder (hereinafter referred to as the "intake pressure"), 19 is an air flow meter, 20 is a coolant water temperature sensor for detecting the temperature of the coolant water of the internal combustion engine, 21 is an intake temperature sensor for detecting the temperature of the intake air supplied inside the cylinder in the intake pipe (hereinafter referred to as the "intake temperature"), and 22 is an electronic control unit (ECU). Reference numeral 50 is a cylinder, 51 and 52 are intake pipes, 53 is a surge tank, 54 is an exhaust pipe, 55 is a spark plug, and 56 is a throttle valve. In the present embodiment, the opening degree of the throttle valve 56 can be changed regardless of the amount of depression of the accelerator pedal (hereinafter referred to as the "accelerator depression"). The intake pressure is controlled by adjusting the opening degree of the throttle valve.

In the present embodiment, the amount of air taken into the combustion chamber 8, that is, the intake quantity, is controlled by coordinated control of the valve opening characteristic of the intake valve 2 and the opening degree of the throttle valve 56 (more specifically, the intake pressure). Note that in other embodiments, in addition to this, it is also possible to control the intake quantity by controlling the opening degree of an idle speed control valve (not shown).

Figure 4:
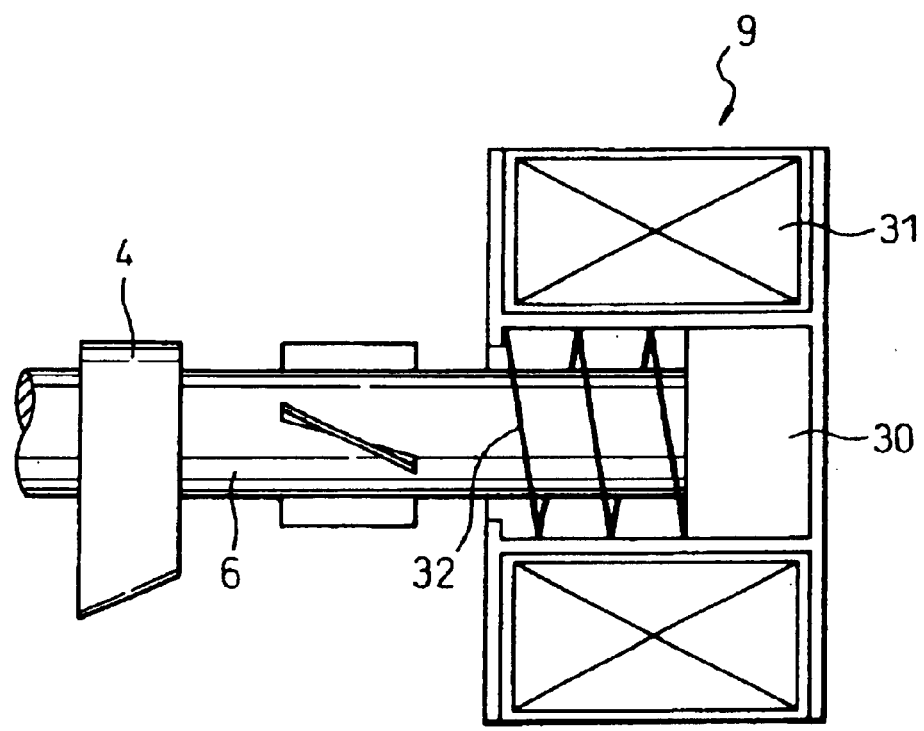
FIG. 4 is a detailed view of a cam movement device etc. shown in FIG. 1.

FIG. 4 is a detailed view of the cam movement device 9 shown in FIG. 1. In FIG. 4, 30 is a magnet connected with the intake valve camshaft 6, 31 is a coil for biasing the magnet 30 to the left side, and 32 is a compression coil spring for biasing the magnet 30 to the right side. Along with the increase of the current passed to the coil 31, the amount by which the cam 4 and camshaft 6 move to the left side increases and the valve lift and action angle of the intake valve 2 are decreased.

Figure 5:
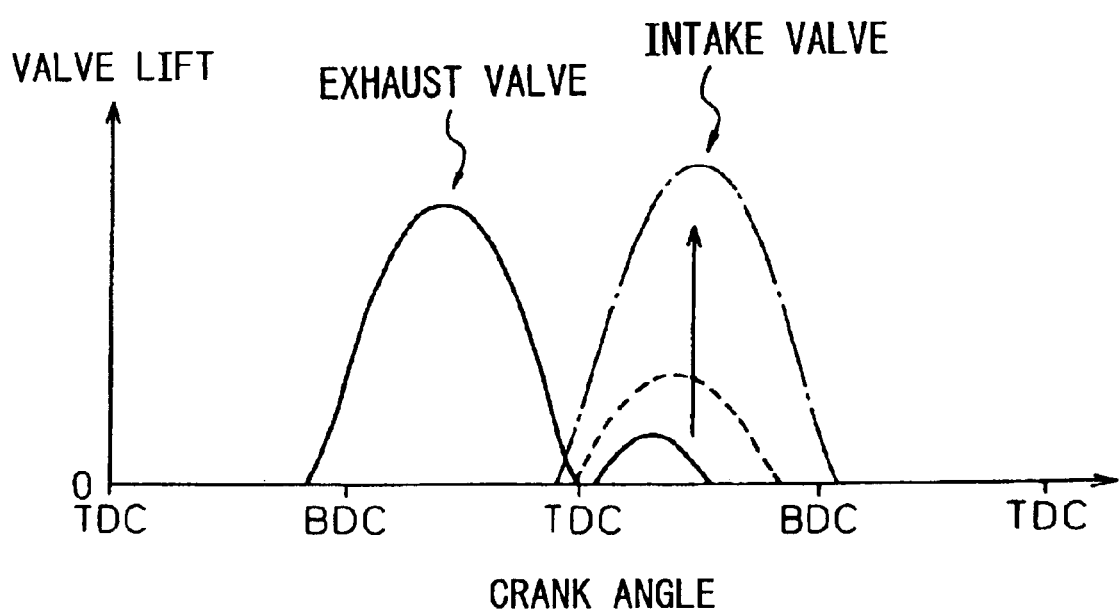
FIG. 5 is a view of the state of change of the valve lift and action angle of an intake valve along with operation of the cam movement device.

FIG. 5 is a view of the state of change of the valve lift and the action angle of the intake valve 2 along with operation of the cam movement device 9. As shown in FIG. 5, along with the decrease in the current passed to the coil 31, the valve lift and action angle of the intake valve 2 are increased (solid line→>broken line→>dot-chain line). Further, in the present embodiment, along with operation of the cam movement device 9, the timing at which the valve lift of the intake valve 2 peaks is also changed. More specifically, as shown in FIG. 5, along with the increase in the valve lift of the intake valve 2, the timing at which the valve lift of the intake valve 2 peaks is delayed.

Figure 6:
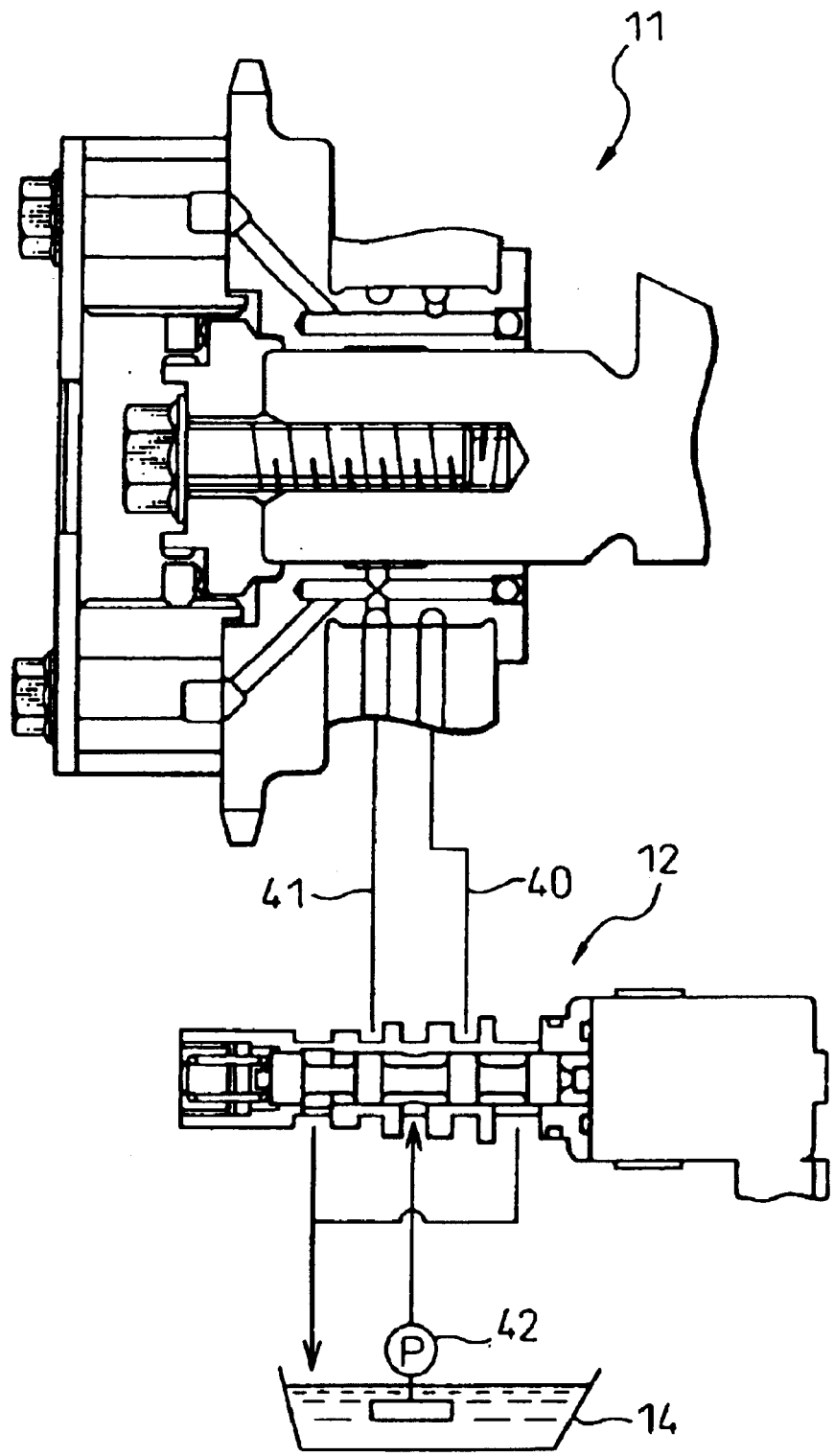
FIG. 6 is a detailed view of an opening/closing timing shift device etc. shown in FIG. 1.

FIG. 6 is a detailed view of the opening/closing timing shift device 11 etc. shown in FIG. 1. In FIG. 6, 40 is an advance side oil passage for shifting the opening/closing timing of the intake valve 2 to the advanced side, 41 is a delay side oil passage for shifting the opening/closing timing of the intake valve 2 to the delayed side, and 42 is an oil pump. Along with an increase in the oil pressure in the advance side oil passage 40, the opening/closing timing of the intake valve 2 is shifted to the advanced side. That is, the rotational phase of the camshaft 6 with respect to the crankshaft 13 is advanced. On the other hand, along with an increase in the oil pressure of the delay side oil passage 41, the opening/closing timing of the intake valve 2 is shifted to the delayed side. That is, the rotational phase of the camshaft 6 with respect to the crankshaft 13 is delayed.

Figure 7:
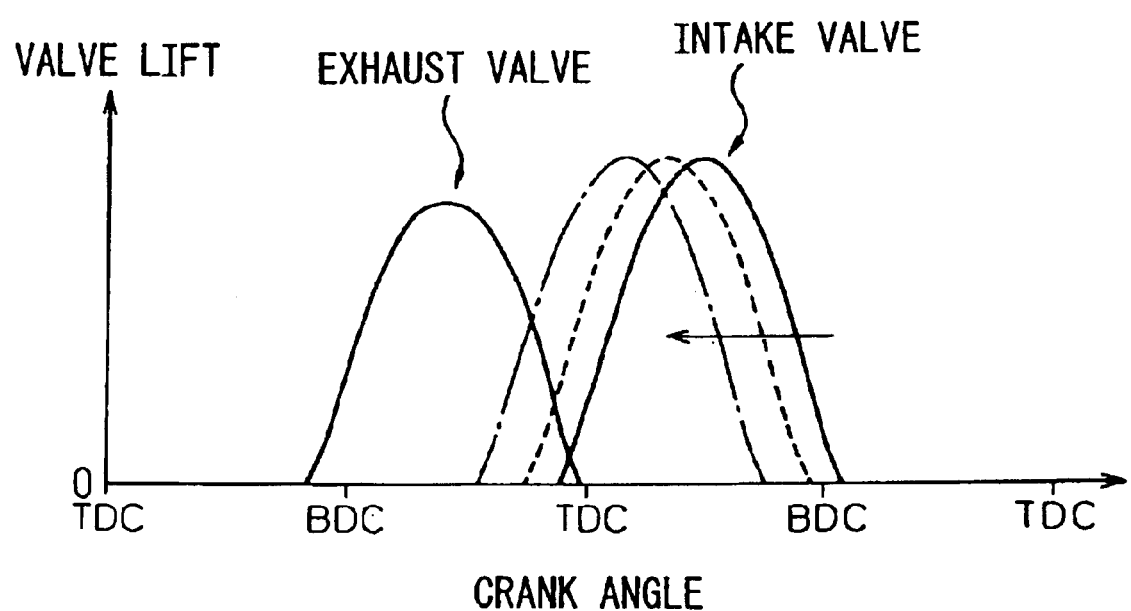
FIG. 7 is a view of the state of shift of the opening/closing timing of an intake valve along with operation of the opening/closing timing shift device.

FIG. 7 is a view of the state of the shift of the opening/closing timing of the intake valve along with the operation of the opening/closing timing shift device 11. As shown in FIG. 7, along with the increase of the oil pressure in the advance side oil passage 40, the opening/closing timing of the intake valve 2 is shifted to the advanced side (solid line→>broken line→>dot-chain line). At this time, the action angle of the intake valve 2 is not changed.

Note that in the present embodiment, only the valve opening characteristic of the intake valve 2 is changed by the cam movement device 9 and the opening/closing timing shift device 11. The valve opening characteristic of the exhaust valve 3 is not changed. In another embodiment, however, it is also possible to make it possible to change the valve opening characteristic of the exhaust valve 3 by providing a cam movement device and opening/closing timing shift device for the exhaust valve. In this case, it is possible to increase the range of adjustment of the valve overlap. Further, in the present embodiment, the intake valve 2 and the exhaust valve 3 are driven mechanically by the cams 4 and 5, but in another embodiment, it is also possible to drive one or both of the intake valve and the exhaust valve electromagnetically.

As explained above, in the intake quantity control apparatus of the present embodiment, it is possible to control the valve opening characteristic of the intake valve 2 by the valve opening characteristic control means, that is, the cam movement device 9 and the opening/closing timing shift device 11, and possible to control the intake pressure by the intake pressure control means, that is, the throttle valve 56. Further, the intake quantity is controlled by coordinated control of the valve opening characteristic and the intake pressure. Below, a specific method for this will be explained with reference to the flow chart of FIG. B.

FIG. 8 is a flow chart of a control routine for intake quantity control in an intake quantity control apparatus of the present embodiment. The control routine is executed by at predetermined times by the ECU 22, that is, by interruption every control period Ts. When the control routine starts, first, at step 101, the target intake quantity Qao to be realized after the elapse of a time corresponding to the control period Ts is determined. This target intake quantity Qao is determined together with the amount of fuel fed after the elapse of a time corresponding to the control period Ts based on the operating state of the engine, more particularly the required torque found from the current engine speed NE and accelerator depression L.

If the target intake quantity Qao is determined at step 101, next, at step 103, an assumed target lift Ltk and assumed target action angle Sak of the intake valve 2 are determined. Note that as clear from the above explanation, in the present embodiment, the lift Lt and the action angle Sa are in a constant relationship. If the action angle Sa is determined, the lift Lt is also determined, so in practice the assumed target action angle Sak is determined using a map.

More specifically, the assumed target action angle Sak is determined based on a map prepared so as to give an action angle Sa giving an optimal combination of the fuel consumption, emission, torque fluctuation, and other conditions for the engine speed NE, target intake quantity Qao, and valve timing of the intake valve 2 (that is, the displacement angle evt due to the opening/closing timing shift device delayed or advanced from the standard opening/closing timing). This map is found by experiments etc. in advance and stored in the ECU 22.

Note that when determining the above assumed target action angle Sak, it is also possible not to use the action angle Sa found by the map directly as the assumed target action angle Sak, but to correct it in accordance with the coolant water temperature Tw. Specifically, for example, when the coolant water temperature Tw is low, sometimes the restriction that the action angle Sa become at least a constant value Sal is added for the purpose of improvement of engine warmup. That is, when the action angle Sa found by the map does not fall under this restriction, Sal is made the assumed target action angle Sak. The restriction relating to the action angle Sa added to improve engine warmup, however, sometimes is cancelled to realize the target intake quantity Qao or an intake quantity closer to the target intake quantity Qao in relation with the later explained intake pressure Pm.

If the assumed target action angle Sak (and assumed target lift Ltk) is determined at step 103, at the next step 105, the assumed target intake pressure Pmk able to realize the target intake quantity Qao by combination with the assumed target action angle Sak (and assumed target lift Ltk) is determined.

Here, the assumed target intake pressure Pmk can be found based on a map prepared in advance for finding the intake pressure Pm for realizing the target intake quantity Qao for the engine speed NE, action angle Sa, target intake quantity Qao, etc., but in the present embodiment, it is found by the following formula (1).

That is, $$Pmk=(b0+b1 \times Sak+b2 \times Sak^2+Qao)/(a0+a1 \times Sak)+C \qquad (1)$$

This formula (1) is a formula showing the relationship between the assumed target intake pressure Pmk and the assumed target action angle Sak or target intake quantity Qao and was obtained experimentally. In the formula, a0, a1, b0, b1, and b2 are coefficients determined based on the engine speed NE, and C is a constant determined based on the engine speed NE, assumed target action angle Sak, and target intake quantity Qao. The map for finding the coefficients a0, a1, b0, b1, and b2 and the map for finding the constant C are found in advance and stored in the ECU 22.

Here, the constant C is a value only for a specific operation region where the assumed target intake pressure Pmk does not match with the value obtained by the first term at the right side of the above formula (1). This is for ensuring that a more accurate assumed target intake pressure Pmk be obtained by the above formula (1) in such a specific operation region as well. By using this constant C, when actually finding the assumed target intake pressure Pmk, this is equivalent to making joint use of the map for directly finding the assumed target intake pressure Pmk in some cases, but by this, complication of the formula (1) for calculating the assumed target intake pressure Pmk is avoided.

By using the above formula (1) to calculate the assumed target intake pressure Pmk, it is possible to reduce the map search operation and lighten the control load compared with when finding the assumed target intake pressure Pmk using a map directly finding the assumed target intake pressure Pmk in all operation regions.

Note that to realize more accurate intake quantity control, it is also possible to add the valve timing of the intake valve 2 to the arguments of the maps for finding the above coefficients a0, a1, b0, b1, and b2 and constant C. Further, in an embodiment where the opening/closing timing of the exhaust valve 3 are variable, it is also possible to add the valve timing of the exhaust valve 3 to the arguments of the maps for finding the above coefficients a0, a1, b0, b1, and b2 and constant C. Alternatively, instead of adding the valve timing of the exhaust valve 3 to the arguments of the maps, it is also possible to enter Qao plus a value ΔQao found based on the valve timing of the exhaust valve 3 (that is, Qao+ΔQao) into the portion of Qao in the above formula (1) to consider the valve timing of the exhaust valve 3. This method is effective when the change in the intake quantity due to the valve timing of the exhaust valve 3 is small. Since the arguments of the maps for finding the above coefficients a0, a1, b0, b1, and b2 and constant C are not increased, the increase in the control load can be suppressed.

Further, in an embodiment having a swirl control valve or other intake flow control valve for causing a special flow in the combustion chamber 8 or an embodiment having a variable capacity valve provided with a variable intake pipe capacity device and controlling that device, it is also possible to provide a plurality of maps for finding the above coefficients a0, a1, b0, b1, and b2 and constant C in accordance with the opening/closing state of the valves or to add the opening degree of these valves to the arguments of the maps. Due to this, it is possible to adjust the effect given to intake quantity of the intake flow control valve or variable intake pipe capacity device and thereby control the intake quantity more accurately.

The processes of the above explained step 103 and step 105 (determination of assumed target action angle Sak and assumed targed intake pressure Pmk) are processes for estimating the valve opening characteristic and intake pressure for realizing the above target intake quantity Qao by a predetermined method. Next, at step 107 and step 109, the ranges of the action angle Sa (and lift Lt) and intake pressure Pm realizable in a predetermined time of the control period Ts are determined.

First, at step 107, the range As of the action angle Sa realizable in the control period TS is determined. In the determination of the range As, at least the mechanical upper limit Samax and lower limit Samin of the action angle Sa and the performance upper limit Sapax and lower limit Sapin are considered. Here, the "mechanical upper limit Samax" is the maximum action angle in the mechanism. In the present embodiment, it is the action angle when operating the cam movement device 9 to bring the valve lifter into contact with the left end of the cam 4 in FIG. 3. Further, the "mechanical lower limit Samin" is the minimum action angle in mechanism. In the present embodiment, it is the action angle when the cam movement device 9 brings the valve lifter into contact with the right end of the cam 4 in FIG. 3.

On the other hand, the performance upper limit Sapax is represented by Sapax=Sapr+Ts·dSamax where the current action angle is made Sapr and the upper limit of the rate of change of the action angle including the response lag of the cam movement device 9 etc. (sign being plus when enlarging the action angle and minus when reducing the action angle) is made dSamax. Similarly, the performance lower limit Sapin is represented by Sapin=Sapr+Ts·dSamin where the lower limit of the rate of change of the action angle including the response lag of the cam movement device 9 etc. (sign being minus when reducing the action angle and plus when enlarging the action angle) is made dSamin. That is, the range represented by the upper limit Sapax and the lower limit Sapin in operation performance is the range of action angle realizable in operation performance of the apparatus in a predetermined time of the control period Ts.

The above range As is basically determined based on the mechanical upper limit Samax and lower limit Samin and the performance upper limit Sapax and lower limit Sapin. That is, the smaller of the mechanical upper limit Samax and the performance upper limit Sapax is made the upper limit SaMAX of the above range As and the larger of the mechanical lower limit Samin and the performance upper limit Sapin is made the lower limit SaMIN of the above range As.

Note that the range of action angle not realizable in mechanism is naturally the range not realizable in a predetermined time of the control period Ts, so when referring to the range As of the action angle Sa realizable in a predetermined time in this specification, it means a range considering not only the performance upper limit Sapax and lower limit Sapin, but also the mechanical upper limit Samax and lower limit Samin.

Further, when determining the above range As, it is also possible to consider additional restrictions relating to operation of the internal combustion engine. That is, for example, even with a positional relationship or valve opening characteristic of the intake and exhaust valves realizable in the mechanism and performance of the cam movement device 9 etc., use of them sometimes is not desirable in operation of the internal combustion engine. Therefore, by adding the restriction that such a positional relationship or valve opening characteristic of the intake and exhaust values should not be used, it is possible to suppress inconveniences in operation of the internal combustion engine which could arise due to the intake quantity control. Here, that is, when determining the above range As, additional restrictions relating to the control range of the action angle relating to the operation of the internal combustion engine may be considered.

For example, when the opening position (opening timing) of the intake valve 2 becomes too delayed, knocking is liable to occur. Here, to prevent this, it may be considered to prevent the opening position IVO of the intake valve 2 from becoming later than the predetermined opening position IVOmax. Further, for this, it is sufficient to designate the advanced side as minus and the delayed side as plus and ensure that IVO≦IVOmax. Here, if Sa is the action angle of the intake valve 2, Sa0 is the center position of the action angle of the intake valve when the opening/closing timing shift device 11 of the intake valve 2 is not operating, and evt is the displacement angle by the opening/closing timing shift device 11 of the intake valve 2 (if advanced, minus, while if delayed, plus), the opening position IVO of the intake valve 2 may be represented by IVO=Sa0−Sa/2+evt. Entering this formula into the above inequality to modify it, Sa≦(Sa0+evt−IVOmax)×2 is obtained.

From this, it is learned that to prevent the opening position IVO of the intake valve 2 from becoming delayed from the predetermined opening position IVOmax, the action angle Sa has to be at least (Sa0+evt−IVOmax)×2. Therefore, when determining the above range As, when considering preventing the opening position IVO of the intake valve 2 from being delayed from the predetermined position IVOmax as an additional restriction relating to the control range of the action angle, when determining the lower limit SaMIN of the above range As, the value of (Sa0+evt−IVOmax)×2 is also compared in addition to the mechanical lower limit Samin and the performance lower limit Sapin and the largest of these is made the lower limit SaMIN of the above range As.

Further, knocking is liable to occur even when the closing position (closing timing) of the intake valve 2 becomes too delayed. Therefore, if considering a restriction of preventing the closing position IVC of the intake valve 2 from being delayed from the predetermined closing position IVCmax to prevent this, in substantially the same way as the case of the opening position IVO of the intake valve 2 explained above, Sa≦(IVCmax−Sa0−evt)×2 is obtained.

From this, it is learned that to prevent the closing position IVC of the intake valve 2 from becoming delayed from the predetermined closing position IVCmax, the action angle Sa has to be no more than (IVCmax−Sa0−evt)×2. Therefore, when determining the above range As, when considering preventing the closing position IVC of the intake valve 2 from being delayed from the predetermined position IVCmax as an additional restriction relating to the control range of the action angle, when determining the upper limit SaMAX of the above range As, the value of (IVCmax−Sa0−evt)×2 is also compared in addition to the mechanical upper limit Samax and the performance upper limit Sapax and the smallest of these is made the upper limit SaMAX of the above range As.

Further, when determining the above range As, if considering making the valve overlap OL not more than the predetermined amount OLmax as an additional restriction relating to the control range of the action angle, the following results (note that here, the explanation will be made taking as an example the case where the opening/closing timing of the exhaust valve 3 as well can be changed by the opening/closing timing shift device). That is, to make the valve overlap OL not more than a predetermined amount OLmax, it is sufficient to ensure that OL(=XVC−IVO)≦OLmax stand. Here, XVC is the closing position of the exhaust valve 3.

Further, as explained above, the opening position IVO of the intake valve 2 can be represented as IVO=Sa0−Sa/2+evt. Further, the closing position XVC of the exhaust valve 3 can be represented by XVC=XVC0+evtex where XVC0 is the exhaust valve closing position when the opening/closing timing shift device of the exhaust valve 3 is not operating and evtex is the displacement angle by the opening/closing timing shift device of the exhaust valve 3 (if advanced, minus, while if delayed, plus). Further, if the formulas of IVO and XVC are entered into the above inequality (that is, OL(=XVC−IVO)≦OLmax) to modify it, Sa≦(OLmax+Sa0+evt−XVC0−evtex)×2 can be obtained.

From this, it is learned that to suppress the valve overlap OL to not more than the predetermined amount OLmax, the action angle Sa has to be not more than (OLmax+Sa0+evt−XVC0−evtex)×2. Therefore, when determining the above range As, if considering suppressing the valve overlap OL to not more than a predetermined amount OLmax as an additional restriction relating to the control range of the action angle, when determining the upper limit SaMAX of the above range As, the value of (OLmax+Sa0+evt−XVC0−evtex)×2 is also compared in addition to the mechanical upper limit Samax and the operation performance upper limit Sapax and the smallest among these is made the upper limit SaMAX of the above range As. Note that by suppressing the valve overlap to not more than the predetermined value, it is possible to suppress deposits on the intake valve 2 due to the reverse flow of the exhaust to the intake side etc.

If the range AS of the action angle Sa realizable in the control period Ts is determined at step 107 considering the mechanical restrictions and performance restrictions and further the additional restrictions, in substantially the same way, at the next step 109, the range Ap of the intake pressure Pm realizable in the control period Ts is determined. In the determination of the range Ap, at least the mechanical or physical upper limit Pmax and lower limit Pmin of the intake pressure Pm and the performance upper limit Pmpax and lower limit Pmpin of the throttle valve 56 are considered.

Here, the upper limit Pmax becomes the atmospheric pressure since the present embodiment is not provided with a supercharger. Further, the lower limit Pmin is vacuum. On the other hand, the performance upper limit Pmpax is represented by Pmpax=Pmpr+Ts·dPmax if the current intake pressure is Pmpr and the upper limit of the rate of change of the intake pressure when changing the intake pressure by operating the throttle valve 56, including the response lag of the throttle valve 56 etc. (sign being plus when raising the intake pressure and minus when lowering the intake pressure) is dPmax. Similarly, the performance lower limit Pmpin is represented by Pmpin=Pmpr+Ts·dPmin if the lower limit of the rate of change of the intake pressure when changing the intake pressure by operating the throttle valve 56, including the response lag of the throttle valve 56 etc. (sign being plus when raising the intake pressure and minus when lowering the intake pressure) is dPmin. That is, the range represented by the performance upper limit Pmpax and lower limit Pmpin is the range of intake pressure realizable in performance of the apparatus in a predetermined time of the control period Ts.

The range Ap is basically determined based on the mechanical or physical upper limit Pmax and lower limit Pmin and the performance upper limit Pmpax and lower limit Pmpin. That is, the lower of the upper limit Pmax and upper limit Pmpax is made the upper limit PmMAX of the range Ap, while the higher of the lower limit Pmin and lower limit Pmpin is made the lower limit PmMIN of the range Ap.

Note that for the range Ap as well, in the same way as the case of the range As, when referring to the range As of the intake pressure Pm realizable in a predetermined time in the present specification, this shall mean the range considering not only the performance upper limit Pmpax and lower limit Pmpin, but also the mechanical or physical upper limit Pmax and lower limit Pmin.

Further, in the same way as the case of the above range As, when determining the above range Ap, it is also possible to consider additional restrictions relating to the operation of the internal combustion engine. That is, even if an intake pressure is realizable from the mechanical or physical viewpoint and performance viewpoint, sometimes various inconveniences would occur if using that intake pressure. Therefore, by adding a restriction that such an intake pressure should not be adopted, it is possible to suppress various inconveniences which could arise due to the intake quantity control. That is, when determining the range Ap, additional restrictions relating to the control range of the intake pressure in relation to the operation of the internal combustion engine may be considered.

For example, when utilizing the fact that the intake pressure is negative at the brake assist mechanism or at purging of the vaporized fuel, it is necessary to prevent the intake pressure Pm from becoming higher than the predetermined pressure Pmvin for the sake of the intake quantity control. That is, in this case, it is necessary to maintain the pressure so that Pm≦Pmvin. Therefore, when determining the above range Ap, if considering maintaining the intake pressure Pm at not more than the predetermined pressure Pmvin as an additional restriction relating to the control range of the intake pressure, when determining the upper limit PmMAX of the above range Ap, the Pmvin is also compared in addition to the upper limit Pmax and the upper limit Pmpax and the smallest of these is made the upper limit PmMAX of the range Ap.

Note that in the above explanation, illustration was given of restrictions provided in relation to the operation of the opening/closing timing shift device of the intake valve and exhaust valve and the existence of auxiliary equipment utilizing the fact that the intake pressure is negative as additional restrictions relating to the control range of the action angle or intake pressure, but the present invention is not limited to these. For example, it is also possible to provide additional restrictions relating to the control range of the action angle or intake pressure relating to the operation of a swirl control valve or other device.

When the range Ap is determined at step 109, next, at step 111, it is judged if the assumed target point KP (Sak, Pmk) determined by the assumed target action angle Sak determined at step 103 and the assumed target intake pressure Pmk determined at step 105 is included in the realizable region Ax (As, Ap) determined by the region As determined at step 107 and the region Ap determined at step 109.

When it is judged at step 111 that the assumed target point KP is included in the realizable region Ax, the routine proceeds to step 113, where the assumed target point KP is made the final target point OP. That is, the assumed target action angle Sak is made the target action angle Sao and the assumed target intake pressure Pmk is made the target intake pressure Pmo. Further, at step 115, the cam movement device 9 and throttle valve 56 are operated so that the action angle Sa and the intake pressure Pm become the target action angle Sao and target intake pressure Pmo and the control routine ends.

Figure 9:
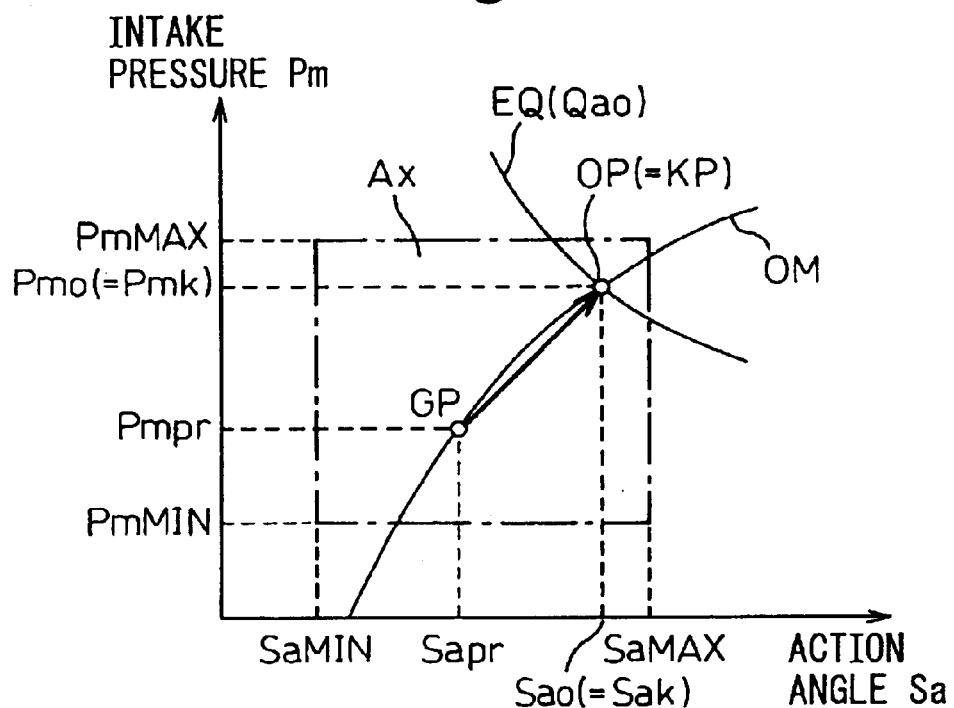
FIG. 9 is an explanatory view of an example of the case where an assumed target point KP is included in a realizable region Ax, that is, when proceeding from step 111 to step 113 in the control routine shown in FIG. 8.

FIG. 9 is an explanatory view showing a case where the assumed target point KP is included in a realizable region Ax, that is, the case where the control routine proceeds from step 111 to step 113. In FIG. 9, the abscissa shows the action angle Sa, while the ordinate shows the intake pressure Pm. The square shown by the dot-chain line is the realizable region Ax.

The point GP (Sapr, Pmpr) is the point showing the state of the action angle Sa and intake pressure Pm before the present, that is, the execution of the current control routine. The curve EQ is the equal intake quantity curve showing the combinations of the action angle Sa and intake pressure Pm where the intake quantity becomes the target intake quantity Qao. On the other hand, the curve OM is the optimal operation curve showing the combinations of action angle Sa and intake pressure Pm giving the optimal combination of the fuel consumption, emission, torque fluctuation, and other conditions. Further, as shown in this figure, usually (that is, except when the value giving the assumed target action angle Sak is corrected in accordance with the coolant water temperature Tw) the intersection of the equal intake quantity line EQ and the optimal operation line OM becomes the assumed target point KP (Sak, Pmk). That is, the processes from step 101 to step 105 can be said to be processes for finding the intersection of the equal intake quantity line EQ and the optimal operation line OM except when the value forming the assumed target action angle Sak is corrected in accordance with the coolant water temperature Tw. Note that the equal intake quantity line EQ and the optimal operation line OM change in accordance with the operating state of the opening/closing timing shift device 11 of the intake valve 2, that is, the displacement angle of the opening/closing timing of the intake valve 2 by the opening/closing timing shift device 11.

The case shown in FIG. 9 is a case where the assumed target point KP is included in the realizable region Ax. In this case, as mentioned above, the assumed target point KP is made the final target point OP at step 113 (OP=KP). Further, as shown by the arrow in FIG. 9, the cam movement device 9 and the throttle valve 56 are operated so that the action angle Sa and the intake pressure Pm which had been in the state of the point GP become the state of the target point OP, the target intake quantity Qao is realized in a predetermined time (in the present embodiment, the control period Ts), and the control routine is ended.

On the other hand, when it is judged at step 111 that the assumed target point KP is not included in the realizable range Ax, the routine proceeds to step 117. At step 117, it is judged if the target intake quantity Qao can be realized in the realizable region Ax, that is, if there is a combination of the action angle Sa and intake pressure Pm able to realize the target intake quantity Qao in the realizable region Ax.

Further, when it is judged at step 117 that there is a combination of the action angle Sa and intake pressure Pm able to realize the target intake quantity Qao in the realizable region Ax, the routine proceeds to step 119. At step 119, the combination closest to the assumed target point KP in the combinations of the action angle Sa and intake pressure Pm for realizing the target intake quantity Qao in the realizable time Ax is selected and made the final target point OP (Sao, Pmo). Next, the routine proceeds to step 115, where the cam movement device 9 and the throttle valve 56 are operated so that the action angle Sa and intake pressure Pm become the target action angle Sao and the target intake pressure Pmo, and the routine ends.

Figure 10:
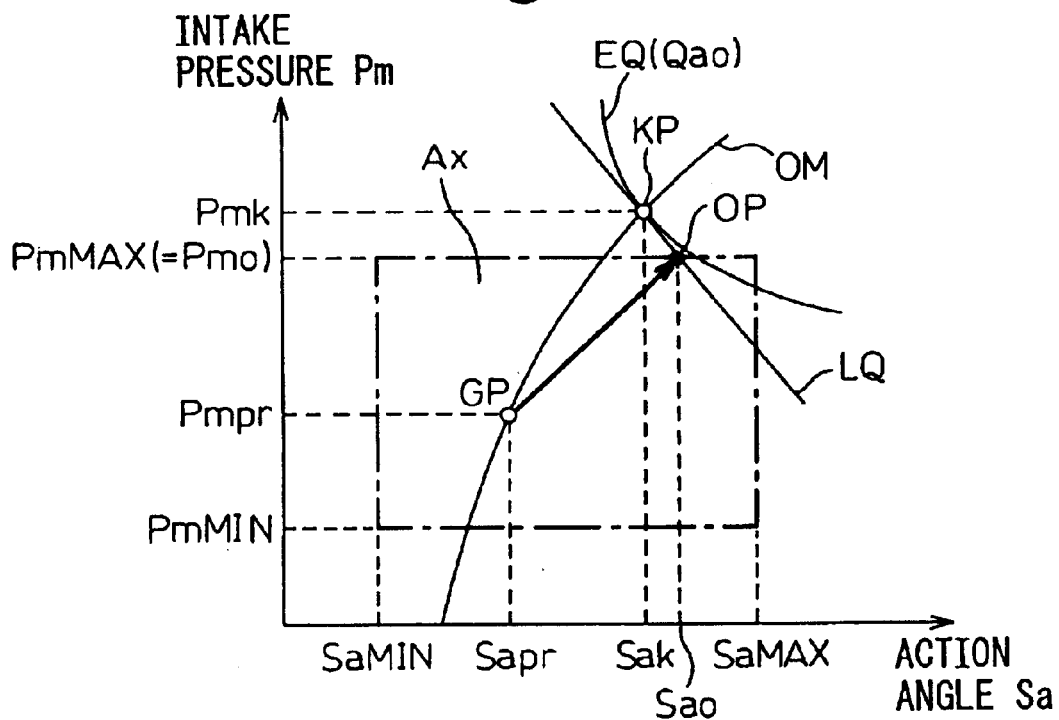
FIG. 10 is an explanatory view similar to FIG. 9 showing an example of the case where there is a combination of an action angle Sa and an intake pressure Pm able to realize a target intake quantity Qao in a realizable region Ax, that is, when proceeding from step 117 to step 119 in the control routine shown in FIG. 8.

FIG. 10 is an explanatory view similar to FIG. 9 showing an example of the case where there is a combination of the action angle Sa and intake pressure Pm able to realize the target intake quantity Qao in the realizable range Ax, that is, the case where the control routine proceeds from the step 117 to the step 119. In the case such as shown in FIG. 10, as explained above, at step 119, the combination closest to the assumed target point KP among the combinations of the action angle Sa and intake pressure Pm for realizing the target intake quantity Qao in the realizable region Ax is selected and made the final target point OP (Sao, Pmo). The combination closest to the assumed target point KP is selected by selecting the one of the two intersections between the equal intake quantity line EQ and the edge of the realizable region Ax (shown by dot-chain line) closer to the assumed target point KP. Alternatively, to lighten the control load, the equal intake quantity line EQ is linearly approximated from the assumed target point KP and a point near it and the one of the two intersections between the approximated line LQ and edge of the realizable region Ax (shown by dot-chain line) closer to the assumed target point KP may be selected. FIG. 10 shows the latter case. The intersection of the line LQ and the line Pm=PmMAX showing the edge of the realizable region Ax is made the target point OP.

If setting the target point OP in this way, as shown by the arrow in FIG. 10, the cam movement device 9 and throttle valve 56 operate so that the action angle Sa and intake pressure Pm which were at the state of the point GP become the state of the target point OP, the target intake quantity Qao is substantially realized in the predetermined time of the control period Ts, and the control routine ends.

If making the assumed target point KP the final target point OP as it were in the case shown in FIG. 10, the state of the action angle Sa and intake pressure Pm at the time when the predetermined time of the control period Ts elapses would probably be near the intersection of the optimal operation line OM and one line Pm=PmMAX showing the edge of the realizable region Ax. The intake quantity realized in this case would end up being considerably different from the target intake quantity Qao.

On the other hand, when it is judged at step 117, that there is no combination of an action angle Sa and intake pressure Pm able to realize the target intake quantity Qao in the realizable region Ax, the routine proceeds to step 121. At step 121, the combination of the action angle Sa and intake pressure Pm for realizing the intake quantity closest to the target intake quantity Qao in the realizable region Ax is selected and made the final target point OP (Sao, Pmo). After this, the control proceeds to step 115, where the cam movement device 9 and throttle valve 56 are operated so that the action angle Sa and intake pressure Pm become the target action angle Sao and target intake pressure Pmo and the control routine ends.

Figure 11:
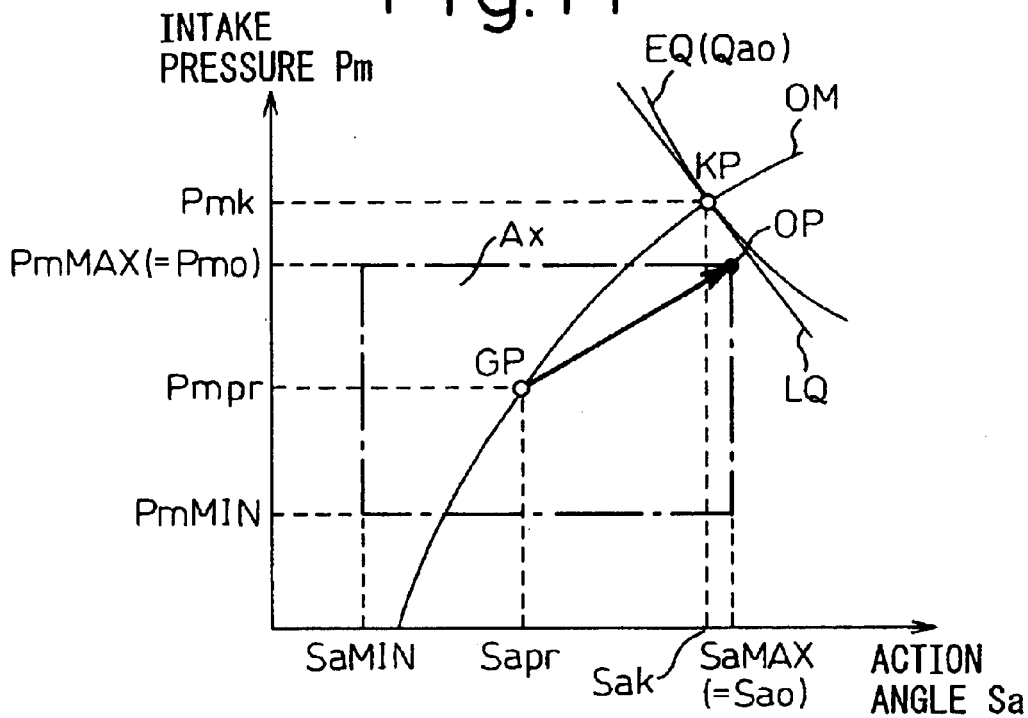
FIG. 11 is an explanatory view similar to FIG. 9 and FIG. 10 showing an example of the case where there is not a combination of an action angle Sa and an intake pressure Pm able to realize a target intake quantity Qao in a realizable region Ax, that is, when proceeding from step 117 to step 121 in the control routine shown in FIG. 8.

FIG. 11 is an explanatory view similar to FIG. 9 and FIG. 10 showing an example of the case where there is no combination of the action angle Sa and intake pressure Pm able to realize the target intake quantity Qao in the realizable range Ax, that is, the case where the control routine proceeds from the step 117 to the step 121. When there is no combination of the action angle Sa and intake pressure Pm able to realize the target intake quantity Qao in the realizable region Ax as shown in FIG. 11, as explained above, at step 121, the combination of the action angle Sa and intake pressure Pm for realizing an intake quantity closest to the target intake quantity Qao in the realizable region Ax is selected and made the final target point OP (Sao, Pmo). In the example shown in FIG. 11, the combination of the action angle Sa and intake pressure Pm for realizing the intake quantity closest to the target intake quantity Qao is represented by one corner of the realizable region Ax, more specifically the intersection of the line Pm=PmMAX and another line Sa=SaMAX showing the edge of the realizable region Ax. This point is made the target point OP.

Further, if the target point OP is set in this way, as shown by the arrow in FIG. 11, the cam movement device 9 and the throttle valve 56 are operated so that the action angle Sa and intake pressure Pm which were at the state of the point GP become the state of the target point OP, an intake quantity closest to the target intake quantity Qao in the range realizable in a predetermined time of the control period Ts is realized, and the control routine is ended.

If making the assumed target point KP the final target point OP as it were in the case shown in FIG. 11, the state of the action angle Sa and intake pressure Pm at the point of time when the predetermined time of the control period Ts elapses would probably be near the intersection of the optimal operation line OM and one line Pm=PmMAX showing the edge of the realizable region Ax. Further, the difference between the intake quantity realized in this case and the target intake quantity Qao becomes considerably larger compared with the difference between the intake quantity realized when setting the target point OP as shown in step 121 and the target intake quantity Qao.

Note that as explained above, at step 119 or step 121, to realize the target intake quantity Qao or to realize an intake quantity close to the target intake quantity Qao, a target point OP different from the assumed target point KP is set. Therefore, for example, even if the assumed target action angle Sak is a value corrected for improvement of engine warmup, a target action angle Sao different from that is set. That is, when proceeding to step 119 or step 121, the restriction relating to the action angle Sa added for improvement of engine warmup at step 103 sometimes is cancelled to realize the target intake quantity Qao or an intake quantity closer to the target intake quantity Qao in relation to the realizable intake pressure Pm (this will be explained further later with reference to FIG. 13).

As explained above, according to the intake quantity control apparatus of the present embodiment, when at least one of the assumed target action angle Sak and assumed target intake pressure Pmk initially set as the action angle Sa and intake pressure Pm for preferably realizing the target intake quantity Qao is not in the above realizable ranges As and Ap, the target action angle Sao and target intake pressure Pmo of the final targets of control are reset so that the intake quantity becomes closest to the target intake quantity Qao or the intake quantity becomes the target intake quantity Qa in the realizable ranges As and Ap. Therefore, it is possible to reliably control the intake quantity to become optimal in the range realizable in a predetermined time and as a result the intake quantity is more preferably controlled.

Note that in the above explanation, the explanation was given taking as an example the case where the valve timing of the intake valve 2 is determined first from the operating state of the internal combustion engine and then an assumed target action angle Sak and assumed target intake pressure Pmk for realizing the target intake quantity Qao are determined corresponding to the valve timing of the intake valve 2, but in another embodiment, it is also possible to positively control the valve timing of the intake valve 2 for the purpose of intake quantity control.

Figure 12:
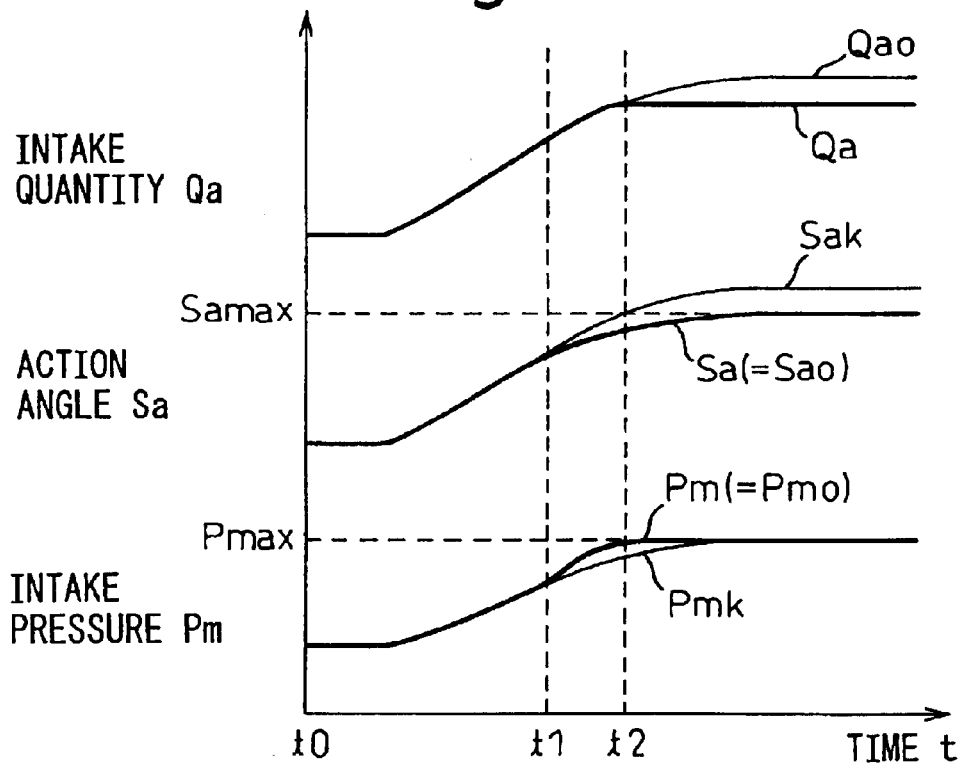
FIG. 12 is a view of the changes along with time of the intake quantity Qa, action angle Sa, and intake pressure Pm at the time of control for an example of intake quantity control by an intake quantity control apparatus according to an embodiment of the present invention.

Next, several examples of the case of the intake quantity control by the intake quantity control apparatus of the present embodiment will be explained with reference to figures showing the changes in the intake quantity, action angle, intake pressure, etc. along with time at the time of control. First, the case of FIG. 12 will be explained. In FIG. 12, the abscissa shows the time, while the ordinate shows, from the top, the intake quantity Qa, the action angle Sa, and the intake pressure Pm. In the part showing the intake quantity Qa, the thin line shows the target intake quantity Qao, while the bold line shows the actual intake quantity Qa. Further, in the part showing the action angle Sa, the thin line shows the assumed target action angle Sak, while the bold line shows the actual action angle Sa or the target action angle Sao. Further, in the part showing the intake pressure Pm, the thin line shows the assumed target intake pressure Pmk, while the bold line shows the actual intake pressure Pm or the target intake pressure Pmo. Note that the parts where the thin lines and bold lines overlap are shown only as bold lines.

In the case of FIG. 12, the interval from the time t0 to the time t1 is the case where the combination of the assumed target action angle Sak and the assumed target intake pressure Pmk, that is, the assumed target point KP, is in the above realizable region Ax. In this case, the assumed target action angle Sak and assumed target intake pressure Pmk match the target action angle Sao and target intake pressure Pmo as explained above and, by realization of the target action angle Sao and target intake pressure Pmo, the target intake quantity Qao is realized.

The interval from the time t1 to the time t2 is the case where the assumed target point KP is no longer in the above realizable region Ax and the case where there is a combination of the action angle Sa and intake pressure Pm able to realize the target intake quantity Qao in the above realizable region Ax. In this case, the combination closest to the assumed target point KP in the combinations of the action angle Sa and intake pressure Pm for realizing the target intake quantity Qao in the realizable region Ax is selected as explained above and made the final target point OP (Sao, Pmo). If looking at the case of the interval from the time t1 to the time t2 of FIG. 12, for the action angle Sa, an action angle Sa smaller than the assumed target action angle Sak is made the target action angle Sao, while for the intake pressure Pm, an intake pressure Pm higher than the assumed target intake pressure Pmk is made the target intake pressure Pmo to make up for the fact that the target action angle Sao is small. Further, by realization of the target action angle Sao and target intake pressure Pmo, the target intake quantity Qao is realized. Note that as a specific example of the case of such control, there is the case where the assumed target action angle Sak cannot be realized due to the slow rate of increase of the action angle Sa.

The interval from the time t2 on is the case where the assumed target point KP is not in the realizable region Ax and the case where there is not any combination of the action angle Sa and intake pressure Pm able to realize the target intake quantity Qao in the realizable region Ax. In this case, the combination of the action angle Sa and the intake pressure Pm realizing an intake quantity closest to the target intake quantity Qao in the realizable region Ax is selected as explained above and made the final target point OP (Sao, Pmo).

In FIG. 12, at the time t2, the intake pressure Pm reaches the mechanical or physical upper limit Pmax (for example, atmospheric pressure) and the intake pressure Pm cannot be raised further. Therefore, the fact that the target action angle Sao is made smaller than the assumed target action angle Sak cannot be corrected and the target intake quantity Qao cannot be realized. However, the combination of the target action angle Sao and target intake pressure Pmo at this time is a combination of the action angle Sa and intake pressure Pm for realizing an intake quantity closest to the target intake quantity Qao in the realizable region Ax. Further, after this, the action angle Sa also reaches the mechanical upper limit Samax and finally an intake quantity closest to the target intake quantity Qao at that time is realized by a combination of an action angle Sa of Samax and an intake pressure Pm of Pmax.

Next, the case of FIG. 13 will be explained. FIG. 13 shows the case where a restriction is added regarding the action angle Sa in accordance with the coolant water temperature Tw for improving engine warmup etc. and the value serving as the assumed target action angle Sak is corrected and the case where such a restriction relating to the action angle Sa is cancelled for realizing the target intake quantity Qao in relation with the intake pressure Pm.

FIG. 13, in the same way as FIG. 12, shows the time on the abscissa and the intake quantity Qa, action angle Sa, and intake pressure Pm on the ordinate. In the case shown in FIG. 13, the target intake quantity Qao is realized at all times, so in the portion showing the intake quantity Qa, the thin line showing the target intake quantity Qao and the bold line showing the actual intake quantity Qa are superposed.

In the part showing the action angle Sa, the thin line shows the assumed target action angle Sak, while the bold line shows the actual action angle Sa or target action angle Sao. The dot-chain line shows the assumed target action angle Sak' in the case where no restriction relating to the action angle Sa is added. In the case shown in FIG. 13, the restriction that the action angle Sa does not become less than a constant value Sal is added for the purpose of improvement of engine warmup. Further, the interval from the time t0 to the time t2 is when the Sak' becomes less than the above Sal, so the assumed target action angle Sak is corrected from the above Sak' to the above Sal (Sak=Sal; where t0≦t≦t2). In the part showing the intake pressure Pm, the thin line shows the assumed target intake pressure Pmk, while the bold line shows the actual intake pressure Pm or target intake pressure Pmo. The dot-chain line shows the intake pressure Pmk' for realizing the target intake quantity Qao corresponding to the above action angle Sak'.

In the case of FIG. 13, the interval from the time t0 to the time t1 is the case where the combination of the assumed target action angle Sak and the assumed target intake pressure Pmk, that is, the assumed target point KP, is not in the above realizable region Ax and the case where there is a combination of the action angle Sa and intake pressure Pm able to realize the target intake quantity Qao in the realizable region Ax. In this case, as explained above, the combination closest to the assumed target point KP in the combinations of the action angle Sa and intake pressure Pm for realizing the target intake quantity Qao in the realizable region Ax is selected and made the final target point OP (Sao, Pmo).

Looking at the interval from the time t0 to the time t1 of FIG. 13, the action angle Sa preferably is made the assumed target action angle Sak considering the improvement of engine warmup etc., but the intake pressure Pmk corresponding to this becomes less than the mechanical or physical lower limit Pmin and therefore this is not realizable. Accordingly, as the combination closest to the assumed target point KP in the combinations of the action angle Sa and intake pressure Pm for realizing the target intake quantity Qao in the realizable region Ax, the action angle smaller than Sa1 and the intake pressure Pmin are selected and made the final target point OP (Sao, Pmo). Further, by realization of these target action angle Sao and target intake pressure Pmo, the target intake quantity Qao is realized.

From the time t1 on, the assumed target point KP is in the above realizable range Ax. In this case, as explained above, the assumed target action angle Sak and assumed target intake pressure Pmk match with the target action angle Sao and target intake pressure Pmo and these target action angle Sao and target intake pressure Pmo are realized, so the target intake quantity Qao is realized.

Next, the case of FIG. 14 will be explained. FIG. 14 shows the case of adding as an additional restriction relating to the control range of the action angle the restriction that the opening position IVO of the intake valve 2 not become later than the predetermined opening position IVOmax. In FIG. 14, the abscissa shows the time, while the ordinate shows, from the top, the intake quantity Qa, the displacement angle evt of the opening/closing timing of the intake valve 2, the action angle Sa, the opening position IVO of the intake valve 2, and the intake pressure Pm. Except for the intake quantity Qa, the changes of the values at the two control patterns A and B are shown by the thin lines (A) and the bold lines (B). For the intake quantity Qa, since this changes in the same way in both of the control patterns, it is shown by only a bold line. The dot-chain line of the part showing the opening position IVO of the intake valve 2 shows the limit position (allowable most delayed position) IVOmax of the opening position IVO added as an additional restriction relating to the control range of the action angle. Note that this IVOmax is determined based on the target intake quantity Qa.

In the case shown in FIG. 14, the opening/closing timing of the intake valve 2 is shifted to the advanced side at the time t1. At this time, if the displacement angle evt of the opening/closing timing changes as in the control pattern A1, if changing the action angle Sa as in the control pattern A2, the opening position IVO changes as in the control pattern A3, so the limit position IVOmax is not exceeded. That is, it does not become at the delayed side from the limit position IVOmax. Further, the intake pressure Pm is changed as in the control pattern A4 so as to realize the target intake quantity Qao.

On the other hand, when the displacement angle evt of the opening/closing timing changes as in the control pattern B1 (that is, for example, when the rate of change of the displacement angle by the opening/closing timing shift device 11 is slow), if changing the action angle Sa as in the control pattern A2, even if the target intake quantity Qa can be realized, the above opening position IVO would end up exceeding the above limit position IVOmax. That is, in this case, since the displacement angle evt of the opening/closing timing is at the delayed side compared with the case of the control pattern A1, even if the action angle Sa changes as shown in the control pattern A2, its magnitude is not sufficient for the opening position IVO to be positioned at the advanced side from the limit position IVOmax.

That is, in this case, the value able to be taken in the control pattern A2 of the action angle Sa is not in the above-mentioned realizable range As (in particular, the realizable range As considering the additional restrictions relating to the control range of the action angle). Therefore, in FIG. 14, when the displacement angle evt of the opening/closing timing changes as in the control pattern B1, the action angle Sa is made to change as in the control pattern B2 taking a certain value in the realizable range As in this case. As a result, the above opening position IVO also is changed as in the control pattern B3 and does not become at the delayed side from the limit position IVOmax. Further, corresponding to the change of the action angle Sa as in the control pattern B2, the intake pressure Pm is changed as in the control pattern B4 to realize the target intake quantity Qao.

Note that in the case shown in FIG. 14, the target intake quantity Qao is realized both in the cases of the control patterns A and B from the time t0 to time t1, the time t1 to time t2, and all times after the time t2. Therefore, control of the action angle Sa and the intake pressure Pm shown in FIG. 14 are equivalent, at all times of both control patterns A and B, to either the case where the assumed target point KP is in the realizable region Ax or the case where the assumed target point KP is not in the realizable region Ax, but there is a combination of the action angle Sa and intake pressure Pm which can realize the target intake quantity Qao in the realizable region Ax.

While the invention has been described with reference to specific embodiments chosen for purpose of illustration, it should be apparent that numerous modifications could be made thereto by those skilled in the art without departing from the basic concept and scope of the invention.

What is claimed is:

1. An intake quantity control apparatus for an internal combustion engine having a valve opening characteristic control means for controlling a valve opening characteristic of at least one of an intake valve and an exhaust valve and an intake pressure control means for controlling an intake pressure and controlling said valve opening characteristic and said intake pressure so as to control the intake quantity, comprising:

a target intake quantity determining means for determining a target intake quantity for after elapse of a predetermined time, a means for determining a range of valve opening characteristic realizable in a predetermined time by said valve opening characteristic control means, and a means for determining a range of intake pressure realizable in a predetermined time by said intake pressure control means, said valve opening characteristic and said intake pressure being controlled by said valve opening characteristic control means and said intake pressure control means so as to become a target valve opening characteristic and target intake pressure set in said realizable ranges based on said target intake quantity.

2. An intake quantity control apparatus for an internal combustion engine as set forth in claim 1, further comprising a means for estimating a valve opening characteristic and intake pressure for realizing said target intake quantity by a predetermined method, wherein when both said valve opening characteristic and intake pressure estimated by said means are in said realizable ranges, said estimated valve opening characteristic and intake pressure are set as said target valve opening characteristic and said target intake pressure, while when at least one of said estimated valve opening characteristic and intake pressure is not in said realizable range, a valve opening characteristic and intake pressure in said realizable ranges whereby said intake quantity becomes closest to said target intake quantity or said intake quantity becomes said target intake quantity are set as said target valve opening characteristic and said target intake pressure.

3. An intake quantity control apparatus for an internal combustion engine as set forth in claim 1, wherein when determining said range of valve opening characteristic realizable in a predetermined time, additional restrictions relating to operation of the internal combustion engine are considered.

4. An intake quantity control apparatus for an internal combustion engine as set forth in claim 3, wherein said additional restrictions relating to operation of the internal combustion engine include a positional relationship and valve opening characteristics of the intake and exhaust valves.

5. An intake quantity control apparatus for an internal combustion engine as set forth in claim 1, wherein when determining said range of intake pressure realizable in a predetermined time, additional restrictions relating to operation of the internal combustion engine are considered.

6. An intake quantity control apparatus for an internal combustion engine as set forth in claim 5, wherein said additional restrictions relating to operation of the internal combustion engine include maintaining the intake pressure at not more than a predetermined pressure.

7. An intake quantity control apparatus for an internal combustion engine controlling an intake quantity by a valve opening characteristic control means for controlling a valve opening characteristic of at least one of an intake valve and an exhaust valve and an intake pressure control means for controlling an intake pressure, comprising:

a target intake quantity determining means for determining a target intake quantity for after elapse of a predetermined time, a target valve opening characteristic determining means for determining a target valve opening characteristic of said valve opening characteristic control means based on said target intake quantity, a target intake pressure determining means for determining a target intake pressure of said intake pressure control means based on said target intake quantity and said target valve opening characteristic, a means for determining a range of valve opening characteristic realizable in a predetermined time by said valve opening characteristic control means, a means for determining a range of intake pressure realizable in a predetermined time by said intake pressure control means, an operation region determining means determining a realizable operation region from ranges of realizable valve opening characteristic and intake pressure, and a target value resetting means for determining a suitable operation point from said range of operation region when the operation point determined from said target valve opening characteristic and said target intake pressure is not in said realizable operation region and resetting the target values of said valve opening characteristic control means and said intake pressure control means from said operation point.

8. An intake quantity control apparatus for an internal combustion engine as set forth in claim 7, wherein said target value resetting means determines an operation point able to realize said target intake quantity or an intake quantity resembling said target intake quantity in said range of realizable operation region and resets the target values of said valve opening characteristic control means and said intake pressure control means from that operation point.

* * * * *